United States Patent [19]
Belasco

[11] Patent Number: 4,883,591
[45] Date of Patent: Nov. 28, 1989

[54] MULTI-PASS FLUID TREATING DEVICE

[76] Inventor: David Belasco, 10702 Rhonda Ave., Garden Grove, Calif. 92643

[21] Appl. No.: 96,131

[22] Filed: Sep. 11, 1987

Related U.S. Application Data

[63] Continuation-in-part of Ser. No. 878,572, Jun. 25, 1986, abandoned, and Ser. No. 81,618, Jul. 31, 1987, abandoned, which is a continuation of Ser. No. 804,297, Dec. 3, 1985, abandoned, which is a continuation-in-part of Ser. No. 783,411, Oct. 3, 1985, Pat. No. 4,731,186.

[51] Int. Cl.$^4$ .......................... C02F 1/48; B01D 35/06
[52] U.S. Cl. .......................................... 210/223; 55/2; 210/222
[58] Field of Search ........................ 210/222, 223, 695; 55/2, 3, 100; 209/223.1, 224, 232

[56] References Cited

U.S. PATENT DOCUMENTS

| | | | |
|---|---|---|---|
| 3,224,583 | 12/1965 | Rosaen | 210/223 |
| 3,468,420 | 9/1969 | Rosaen | 210/223 |
| 3,680,705 | 8/1972 | Happ et al. | 210/222 |
| 3,923,660 | 12/1975 | Kottmeier | 210/222 |
| 3,951,807 | 4/1976 | Sanderson | 210/222 |
| 4,153,559 | 5/1979 | Sanderson | 210/222 |
| 4,289,621 | 9/1981 | O'Meara, Jr. | 210/222 |
| 4,299,700 | 11/1981 | Sanderson et al. | 210/222 |
| 4,357,237 | 11/1982 | Sanderson | 210/222 |
| 4,417,984 | 11/1983 | O'Meara, Jr. | 210/222 |
| 4,428,837 | 1/1984 | Kronenberg | 210/223 |
| 4,450,075 | 5/1984 | Krow | 210/223 |
| 4,455,229 | 6/1984 | Sanderson et al. | 55/100 X |
| 4,469,076 | 9/1984 | Wolff | 210/222 |
| 4,564,448 | 1/1986 | O'Meara, Jr. | 210/222 |

FOREIGN PATENT DOCUMENTS

85/03649  8/1985  PCT Int'l Appl. ................. 210/222

*Primary Examiner*—W. Gary Jones

[57] ABSTRACT

Disclosed is a magnetic conditioning device and method of using such device including a container having an inlet and an outlet and a row of magnets disposed within the container between the inlet and the outlet. The magnets are aligned so that the adjacent ends of magnets will have the same polarity. Disposed between these adjacent ends are a pair of concentrator plates. This creates an alternating magnetic field of varying intensity which surrounds the magnets. The device includes means for directing the fluid through this magnetic field, preferably making several passes through this field before exiting the container. Preferably, both ends of the array of magnets are of a southern polarity.

13 Claims, 8 Drawing Sheets

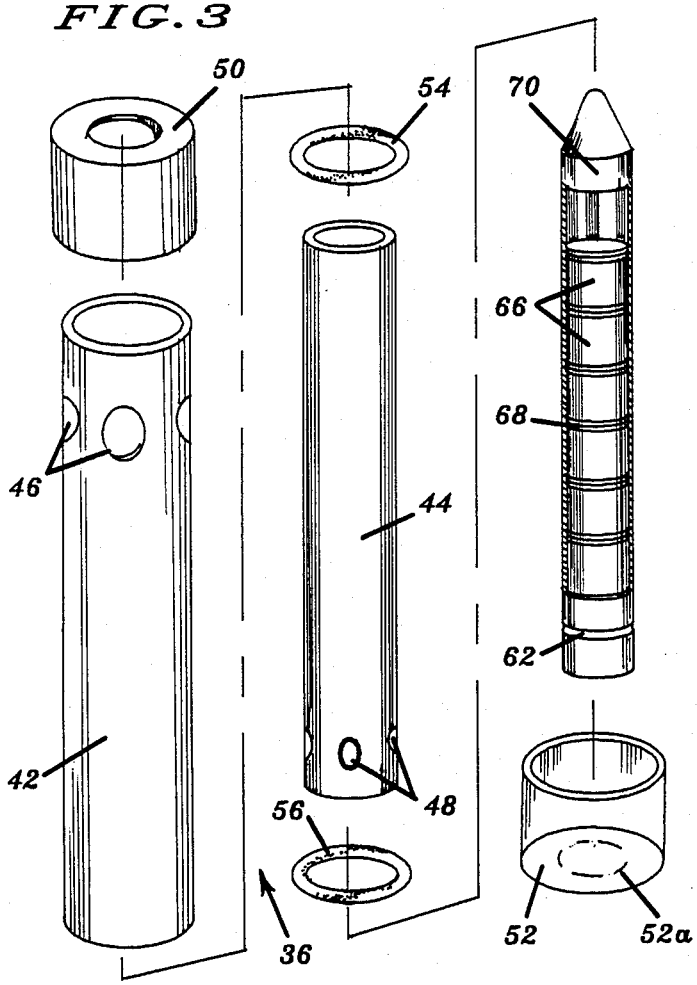
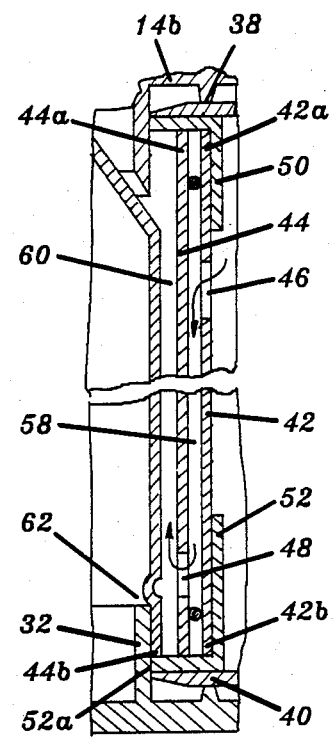
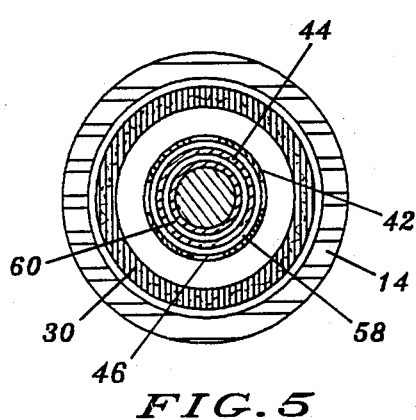
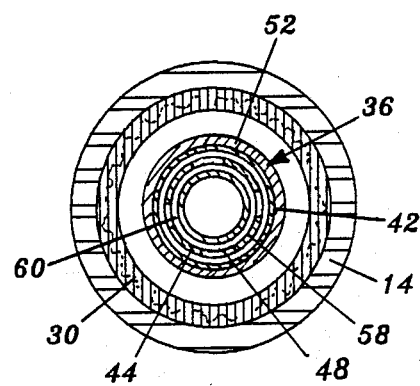

MULTI-PASS FLUID TREATING DEVICE

RELATED APPLICATIONS

This application is a continuation-in-part application of U.S. Ser. No. 06/878,572 filed June 25, 1986, and entitled MULTI-PASS FLUID TREATING DEVICE, now abandoned, and is a continuation-in-part application of U.S. patent application Ser. No. 07/081,618, filed July 31, 1987, and entitled FLUID TREATING DEVICE, now abandoned, which is in turn a continuation of U.S. patent application Ser. No. 06/804,297, filed Dec. 3, 1985, and entitled FLUID TREATING DEVICE (now abandoned), which in turn is a continuation-in-part application of U.S. patent application Ser. No. 06/783,411, filed Oct. 3, 1985, and entitled FLUID TREATING DEVICE now U.S. Pat. No. 4,731,186. All of these above-identified patent applications are incorporated herein and made part of this patent application.

BACKGROUND OF THE INVENTION

1. Field of the Invention

This invention relates to a device and method for conditioning fluids by passing them through a magnetic field, and particularly, an apparatus and method wherein the fluid is subjected to a magnetic field of alternating intensity and, preferably, is passed through such field several times within the device prior to exiting the device.

2. Background Discussion

In the above-identified patent applications there are disclosed various devices for conditioning a fluid by subjecting the fluid to a magnetic field. Typically, a container is employed having an inlet, an outlet and within the container, between the inlet and the outlet, a row of magnets. The fluid enters the container through the inlet, passes by the row of magnets, and then out the outlet.

The fluid contains suspended particulates and dissolved minerals. The particulates are believed to be sequestered by the molecules of the fluid such as water. The magnetic field disrupts the sequestering force of the molecules and allows these particulates, by intimate contact with the fluid, to be used as seeding centers around which the dissolved minerals nucleate and become suspended in the fluid. This prevents scaling by suppressing the concentration of dissolved minerals below the threshold at which they would otherwise crystallize on the walls of the pipe carrying the fluid.

Magnetic conditioning of fluids has been known for many years. It has not, however, been widely adopted, because the claimed benefits have not always materialized when such magnetic conditioners have been used under actual field conditions. After an extended period of research and development, including the development and testing of the experimental apparatus disclosed in the above mentioned patent applications under actual field conditions, an improved magnetic treatment apparatus and method have now been developed.

SUMMARY OF THE INVENTION

The present invention comprises a magnetic conditioning device employing a unique magnetic array configuration which provides an asymetric magnetic field of controlled, alternating intensity and a method of using this device wherein the fluid is directed to pass through this alternating field a plurality of times prior to exiting the device.

There are several features of this invention which contribute to its desirable attributes. Without limiting the scope of this invention as expressed by the claims, its more prominent features will now be discussed briefly. After considering this discussion, and particularly after reading the section of this application entitled DESCRIPTION OF THE PREFERRED EMBODIMENTS, one will understand how the features of this invention provide for a magnetic fluid conditioning device which is easy to operate and maintain and which is effective in its intended usage over a broad range of fluid velocities.

One feature of the present invention is the use of a row of magnets which are aligned along a common axis and employ pairs of concentrator plates between adjacent ends of the magnets. The magnets are aligned with each other so that adjacent ends will have the same polarity. When an even number of magnets are employed the magnets may be arranged so that the two extreme terminal ends of the row of magnets will each be of a southern polarity. This is desirable since it enables fluid to flow in either direction and still be effectively magnetically conditioned. The pairs of concentrator plates between adjacent ends of the magnets assist in providing sharply defined peaks and valleys of intensity in the magnetic field.

The second feature of this invention is the use of spacer members between the pairs of concentrator plates. These spacers are a nonmagnetic material in contrast to the concentrator plates which are a magnetic material such as soft iron. These spacer plates will control the shape of the field. The number and length of individual spacers is determined by the fluid velocity range of the specific installation where the device is used. As will be explained in greater detail below, the spacers are used to create an asymetric field. This enables the device to be effective even though the velocity of the fluid passing through the field is not at the optimum design velocity.

The third feature of this invention is the use of a tubular nonmagnetic member to contain the row of magnets which are aligned along the longitudinal axis of the tubular member. Preferably this nonmagnetic tubular member is removably mounted inside a container which has an inlet and an outlet for the fluid and positioned within the container so that essentially laminar flow is established with the fluid moving around the tubular member generally parallel to the common axis along which the magnets are aligned.

The fourth feature of this invention is the use of flow control means to direct the fluid through the container so that it makes a plurality of passes by the row of magnets prior to exiting the outlet. The fluid moves through the magnetic field as it makes said plurality of passes generally parallel to the row of magnets along a plurality of paths having lengths longer than the row of magnets to permit reestablishment of essentially laminar flow after the turbulence experienced after each change of direction. The turbulence serves to effectively mix suspended particulates with the fluid prior to subsequent conditioning passes by the magnets.

BRIEF DESCRIPTION OF THE DRAWING

The device of this invention is illustrated in the accompanying drawing wherein like numerals indicate like parts and in which:

FIG. 3 is an exploded perspective view of the magnetic conditioning assembly and its associated flow directing sub-assembly.

FIG. 5 is a cross sectional view taken along line 5-5 of FIG. 4.

FIG. 6 is a cross sectional view taken along line 6—6 of FIG. 4.

FIG. 7 is an enlarged cross sectional view showing fluid flowing past the magnetic conditioning assembly.

DESCRIPTION OF THE PREFERRED EMBODIMENTS

First Embodiment of the Invention

Referring to FIGS. 1 through 7, there is disclosed the first embodiment of the device 10 of this invention including two containers 12 and 14 through which the fluid to be treated flows sequentially.

Figure 4:
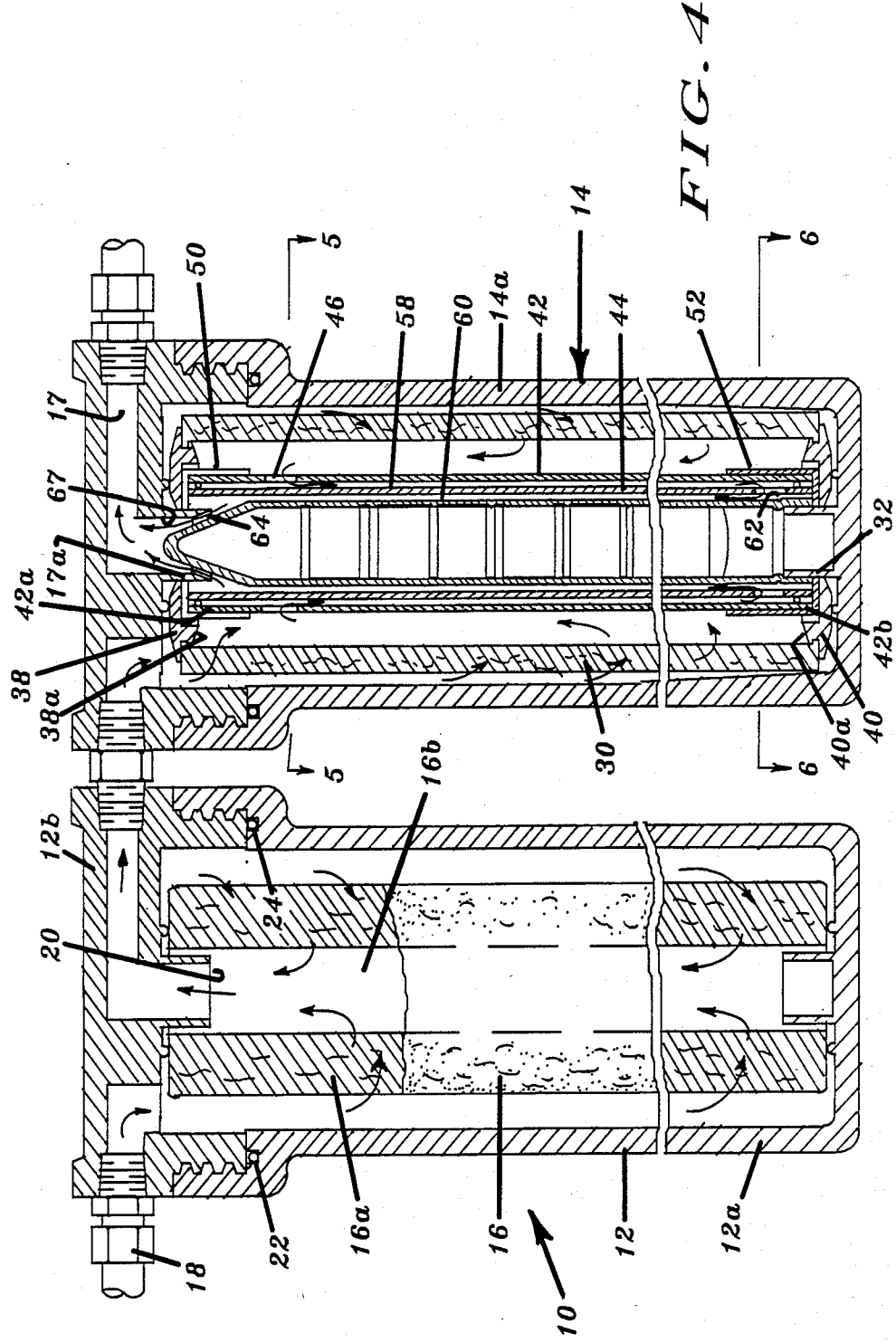
FIG. 4 is a cross sectional view taken along line 4—4 of FIG. 1.
Figure 8:
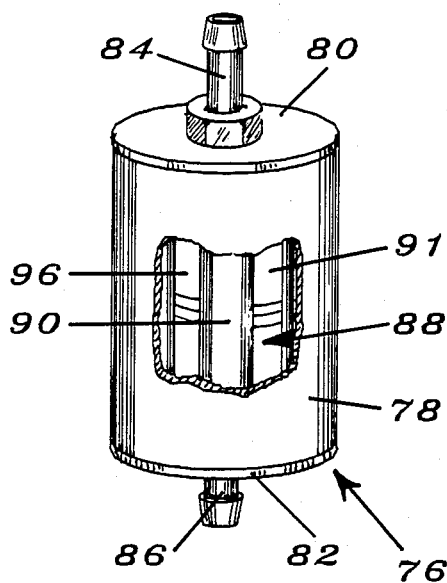
FIG. 8 is a perspective view of the second embodiment of this invention, with a section broken away.
Figure 10:
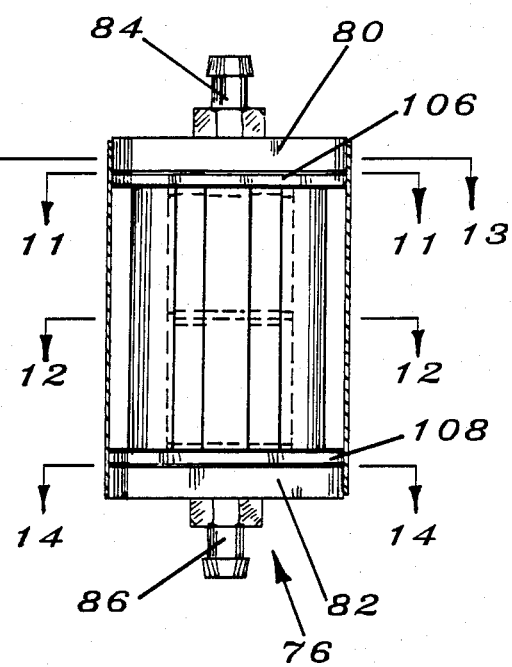
FIG. 10 is a side elevational view with a wall section removed to show the internal elements of the device shown in FIG. 8.

As best illustrated in FIG. 4, the one container 12 includes a bottom section 12a and a top section 12b screwed into the bottom section and containing a filter element 16. The fluid to be treated, for example water, flows in through an inlet 18 in the top section 12b then downwardly into the bottom section 12a through the cylindrical wall 16a of the filter element 16 and out the outlet 20 which is aligned with the central hollow section 16b of the filter element. An O-ring 22 lodged in a niche 24 is used to provide a seal between the top and bottom sections 12b and 12a.

As the filtered fluid leaves the outlet 20, it passes through a nipple member 26 that is connected to the inlet 28 of the second container 14. This second container 14 is constructed similar to the first container 12 having a top section 14b, bottom section 14a, and a cylindrical, hollow, filter element 30 disposed so that the longitudinal axis of the filter element is coaxial with the longitudinal axis of the second container. The top section 14b includes an outlet 17 having an inwardly extending protrusion 17a. In the bottom section 14a is a raised cylindrical retainer element 32 which carries a magnetic conditioning assembly 34. This assembly 34 is disposed centrally within the filter element 30 and a flow directing subassembly 36 surrounds the magnetic conditioning assembly. The subassembly 36 is also received centrally within the filter element 30 and is arranged so that the longitudinal axis of this subassembly is coaxial with the longitudinal axis of the magnetic conditioning assembly 34 and the container 14. There are top and bottom end pieces 38 and 40 which fit snugly into the open ends of the filter element 30, each end piece having an inwardly extending annular ridge 38a and 40a, respectively.

Figure 1:
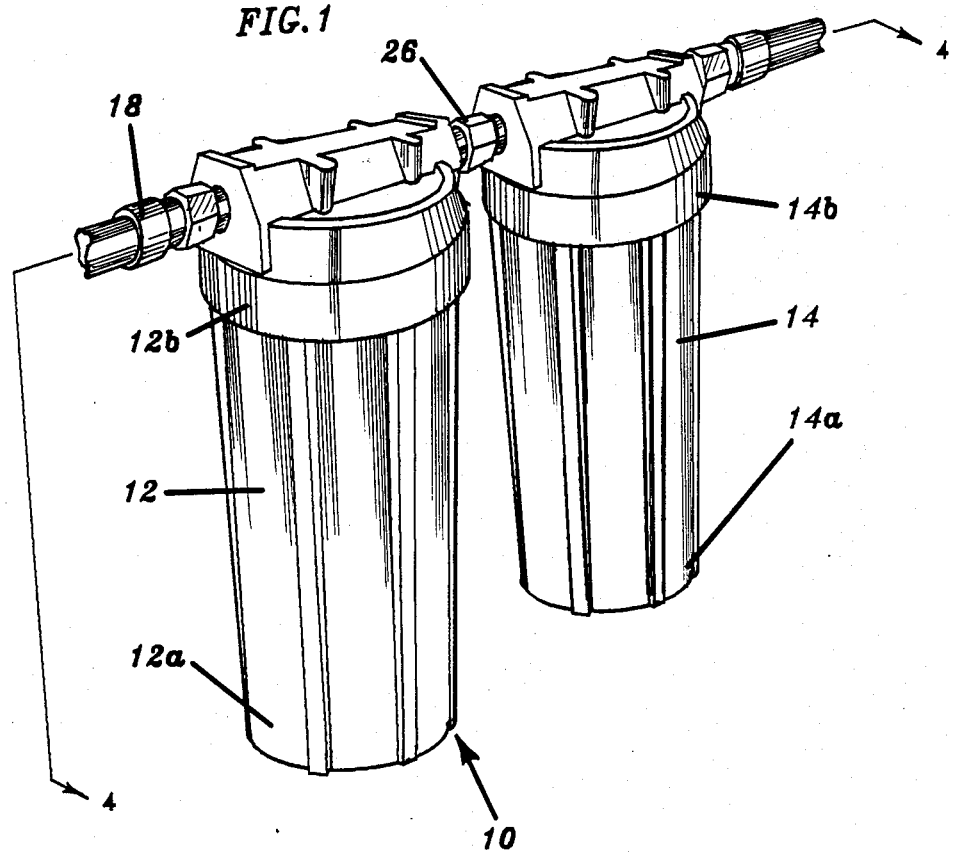
FIG. 1 is a perspective view of the first embodiment of the magnetic fluid conditioning device of this invention.
Figure 2:
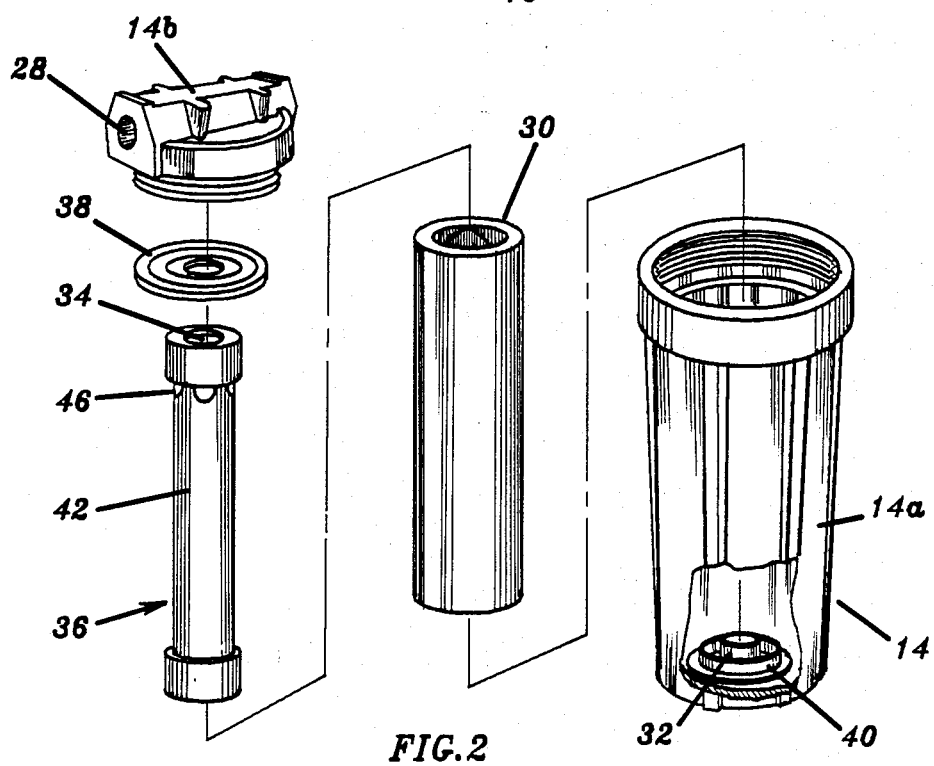
FIG. 2 is an exploded perspective view of a portion of the device shown in FIG. 1 which employs the magnetic conditioning assembly.

As best illustrated in FIGS. 2 and 3, the flow directing subassembly 36 includes a pair of plastic, tubular members 42 and 44 having different diameters. The larger diameter tubular member 42 has open ends 42a and 42b and near the top end 42a a series of holes 46 which allow fluid to pass through the holes inside the tubular member 42. The smaller diameter tubular member 44 is similarly constructed having open ends 44a and 44b with a series of holes 48 at the bottom end 44b. The smaller diameter member 44 is received within the larger diameter member 42 and both of these members are received in top and bottom end caps 50 and 52 with a pair of silicone "O" ring members 54 and 56 disposed near the ends of the members 42 and 44 to establish a fixed gap 58 between the walls of the tubes which permits fluid to flow through this gap 58. The member 44 is spaced away from the magnetic conditioning assembly 34 to provide therebetween a second gap 60.

The device 10 is easy to assemble. First the two top sections 12b and 14b are connected together as shown in FIG. 4 by the nipple member 26. The filter element 16 is placed in the bottom section 12a and this bottom section 12 is screwed onto the top section 12b. Next the bottom end piece 40 is inserted into the bottom section 14a of the container 14 with the retainer element 32 extending through the opening. The end piece 38 is placed over the protrusion 17a as shown in FIG. 4. The end pieces 38 and 40 are seated so that their respective ridges 38a and 40a face inwardly. The flow directing subassembly 36 is now assembled by positioning tubular member 44 inside tubular member 42, with the holes 46 and 48 at opposite ends of the subassembly 36. The "O" rings 54 and 56 are placed between the tubular members near the ends of these members and the end caps 50 and 52 are placed over the ends of the coaxial members 42 and 44. The magnetic conditioning assembly 34 is now placed into the bottom section 14a, positioning it firmly onto the retainer element 32. The lower end of the flow directing subassembly 36 is placed over the magnetic conditioning assembly 34, sliding it over the magnetic conditioning assembly and into position on the bottom of section 14a as shown in FIG. 4. The filter 30 is placed inside the bottom section 14a and this section is now screwed onto the top section 14b to complete the assembly of the device 10.

As best illustrated in FIG. 7, there is a space 64 between the wall 67 forming the outlet 17 of the container 14 and the top of the magnetic conditioning assembly 34 so that fluid may readily flow first through the top holes 46, then through the gap 58, then through the bottom holes 48 and upwardly between the gap 60, and out the outlet 17 through the space 64.

In accordance with one of the features of this invention, the flow of fluid past the magnetic conditioning assembly 34 is generally parallel to the longitudinal axis of this assembly and is within the alternating magnetic field provided by this assembly. The flow of fluid moves along two paths, specifically, a downward path commencing just at the point of entry into the magnetic field and then reversing direction and flowing upwardly once again passing through the magnetic field. The length of these flow paths is slightly longer than the magnetic field. Care is taken so that the fluids direction is not reversed until it has moved past the magnetic field. In other words it is undesirable to reverse the direction of flow in making the multiple passes through the magnetic field while in the magnetic field. As will be explained in greater detail hereafter, the magnetic conditioning assembly includes a series of magnets 66 which are spaced apart by concentrator plates 68. These concentrator plates are disposed between adjacent ends of the magnets and there are two plates employed between each magnet. The magnets and plates are contained within a nonmagnetic tubular member 70 which is sealed so that fluid does not enter the magnetic conditioning assembly 34.

Second Embodiment of the Invention

The device 76, the second embodiment of this invention, is illustrated in FIGS. 8 through 16. In this device 76 a metal container 78 is employed including top and bottom end caps 80 and 82 having, respectively, an inlet 84 and an outlet 86 therein. The top and bottom end caps 80 and 82 may be welded in position after first placing within the container the magnetic conditioning assembly 88 and associated flow directing tubes 90–96.

Figure 9:
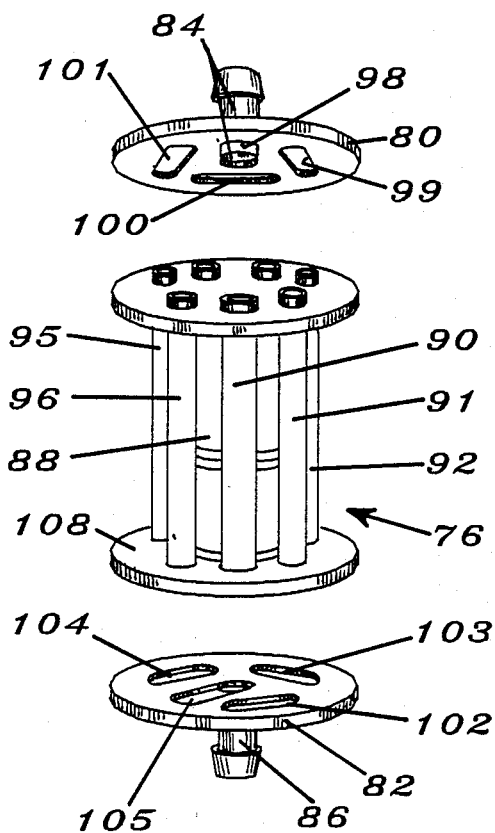
FIG. 9 is an exploded perspective view of the internal parts of the device shown in FIG. 8.
Figure 11:
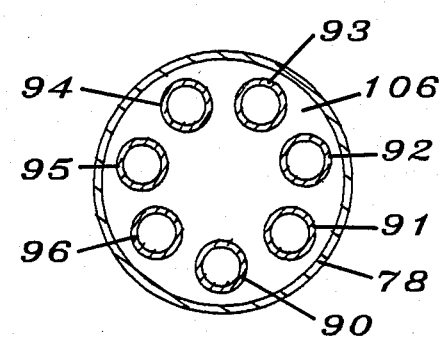
FIG. 11 is a cross sectional view taken along line 11—11 of FIG. 10.
Figure 12:
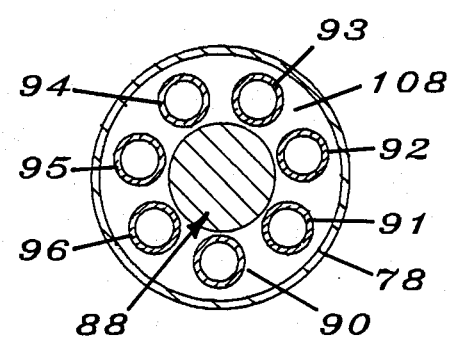
FIG. 12 is a cross sectional view taken along line 12—12 of FIG. 10.
Figure 13:
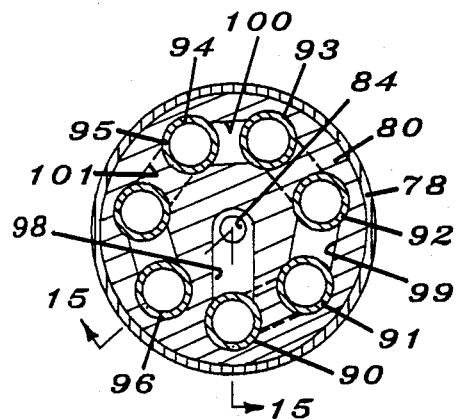
FIG. 13 is a cross sectional view taken along line 13—13 of FIG. 10.
Figure 14:
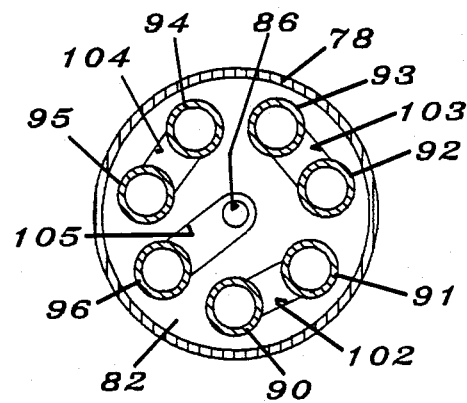
FIG. 14 is a cross sectional view taken along line 14—14 of FIG. 10.
Figure 15:
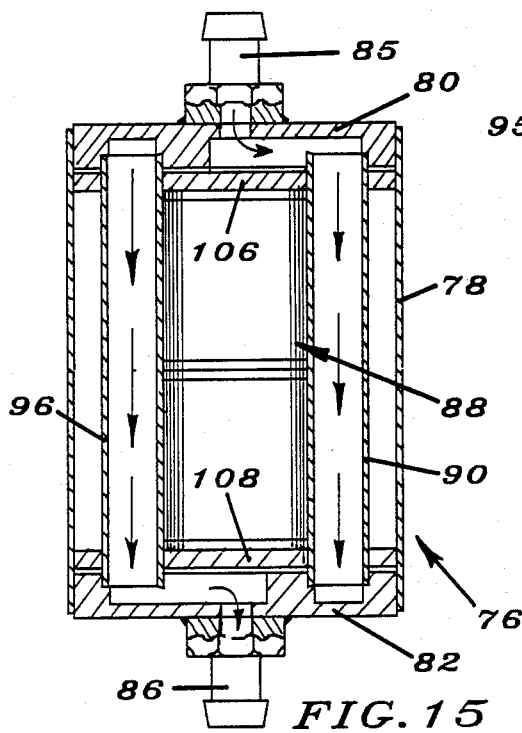
FIG. 15 is a cross sectional view taken along line 15—15 of FIG. 13.
Figure 23:
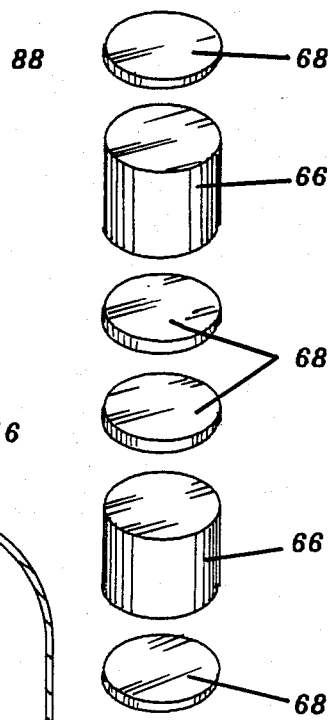
FIG. 23 is an exploded perspective view of the magnetic array employed in the device shown in FIG. 15.

As best illustrated in FIG. 9, each of the end caps 80 and 82 includes elongated slot-like recesses 98–105 which serve as fluid guideways. Each of these recesses 98–105 are associated with pairs of tubes 90–96. The tubes 90–96 are connected to circular plates 106 and 108 and disposed between the plates and surrounded by the tubes is the magnetic conditioning assembly 88. This magnetic assembly 88 is best illustrated in FIG. 23 and includes a pair of spaced apart magnets 66 having two concentrator plates 68 disposed between the adjacent ends of the plates and single concentrator plates 68 at the free ends of the magnets.

Figure 16:
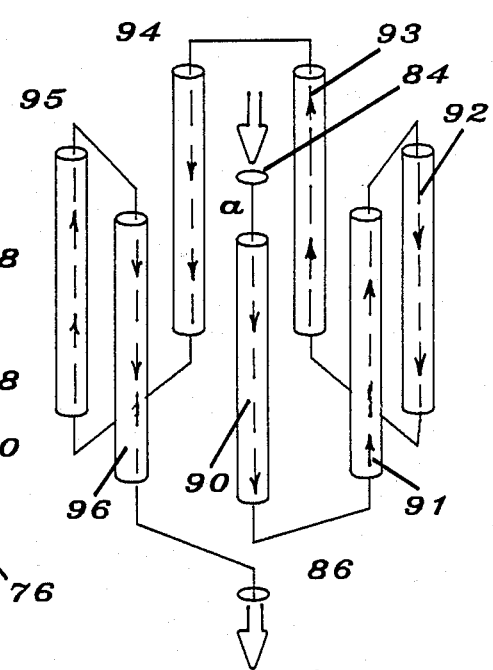
FIG. 16 is a schematic illustration showing diagramatically the serial flow of fluid through the device shown in FIG. 8.
Figure 17:
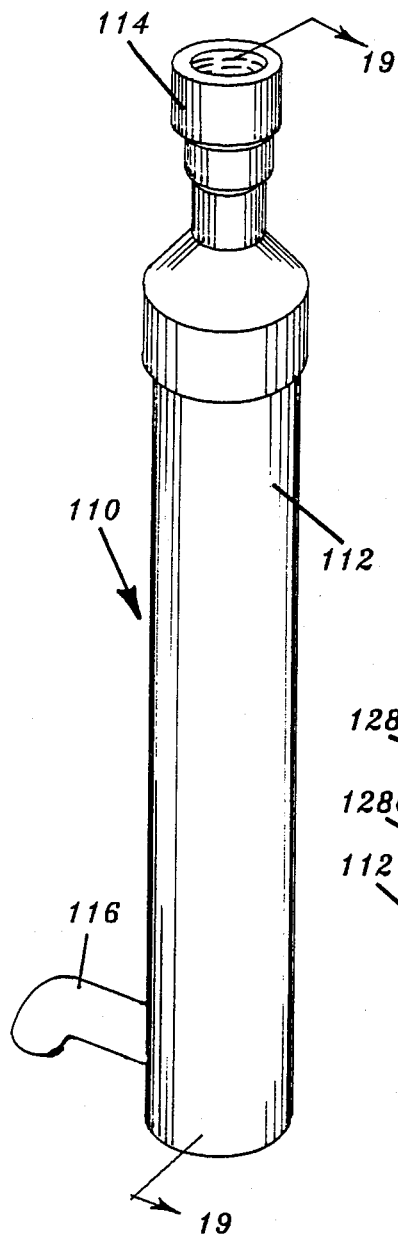
FIG. 17 is a perspective view of the third embodiment of this invention.
Figure 18:
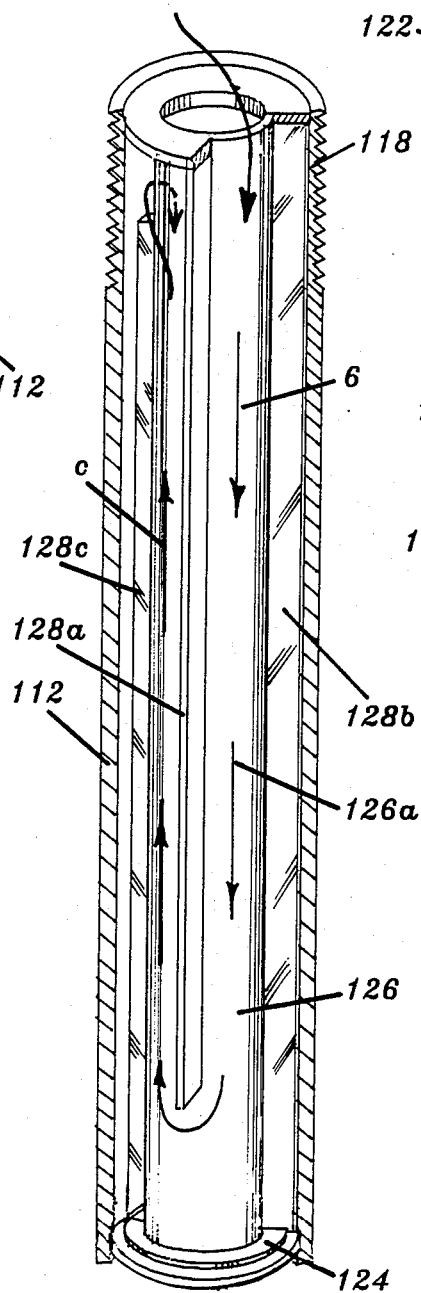
FIG. 18 is a perspective view with sections broken away of the fluid directing elements employed by the device shown in FIG. 17.
Figure 19:
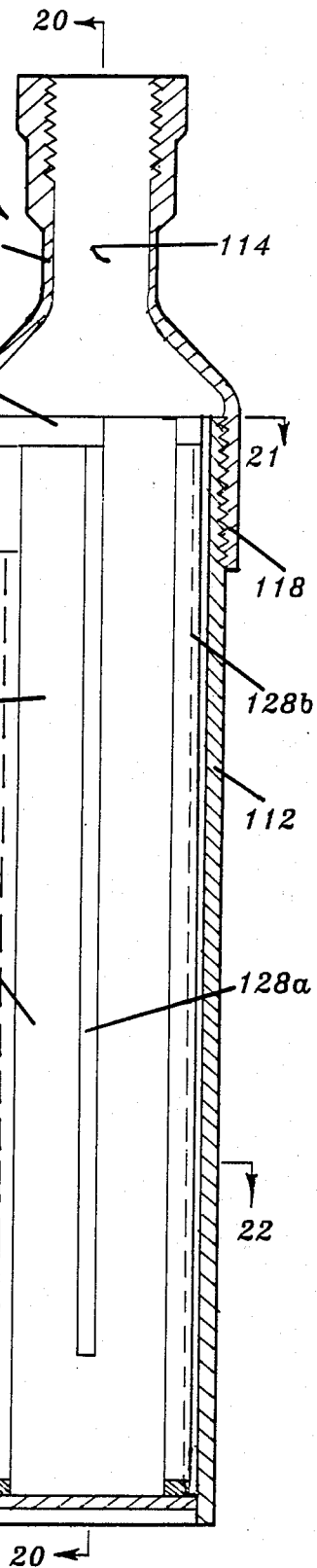
FIG. 19 is a cross sectional view taken along line 19—19 of FIG. 17.
Figure 20:
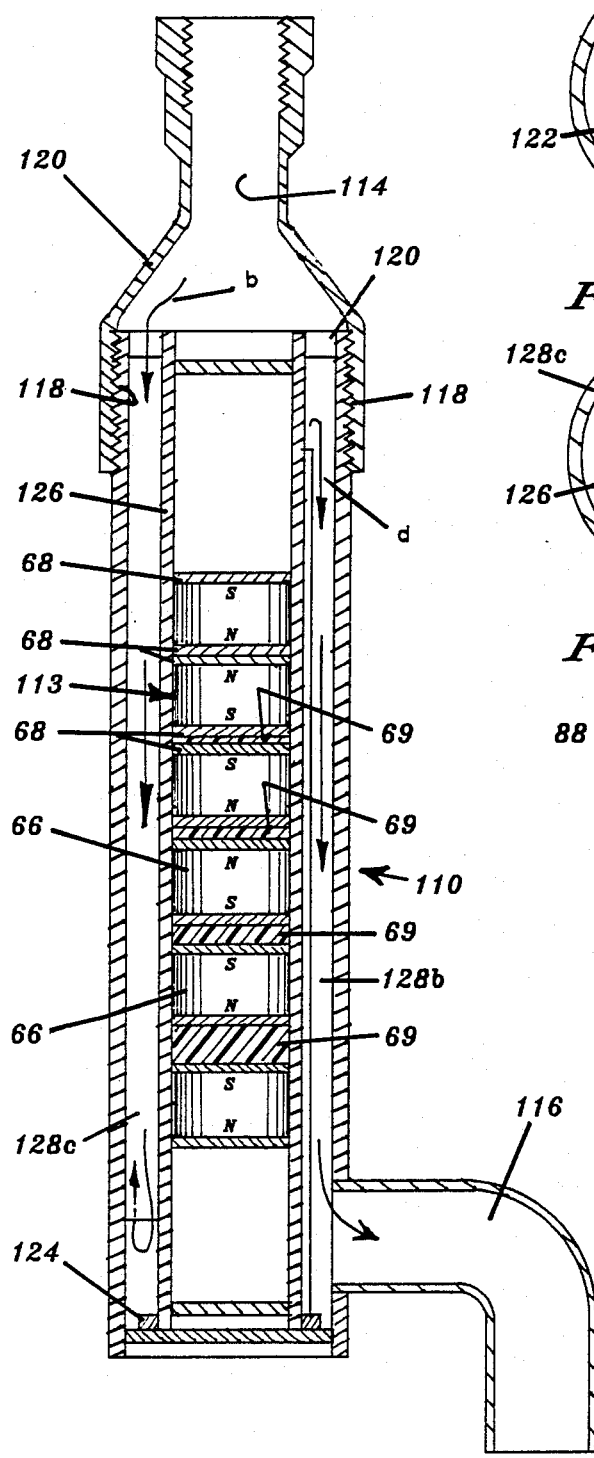
FIG. 20 is a cross sectional view taken along line 20—20 of FIG. 17.
Figure 21:
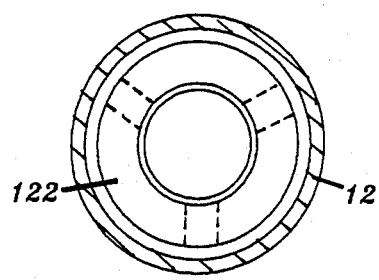
FIG. 21 is a cross sectional view taken along line 21—21 of FIG. 19.
Figure 22:
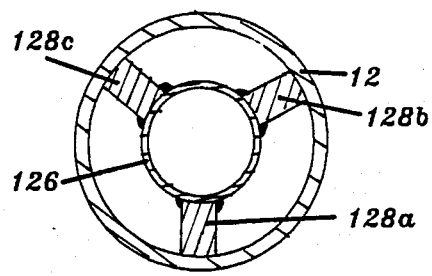
FIG. 22 is a cross sectional view taken along line 22—22 of FIG. 19.

As best illustrated in FIG. 16, fluid flows serially as indicated by the arrow A through the inlet 84 and recess 98 into the one tube 90, out this tube 90 and through the recess 102 into the tube 91, through this tube 91 and into recess 99, and then into the tube 92, out the tube 92 into the recess 103 and into the tube 93, out the tube 93, and through the recess 100 and into tube 94 through the recess 104 into tube 95 and then out this tube 95 through the recess 101 into the tube 96 and out the this tube 96 through the recess 105 into the outlet 86 of the device 76.

Third Embodiment of the Invention

As best illustrated in FIGS. 17 through 22, the third embodiment of this invention, device 110, is depicted showing a container 112 having an inlet 114 and an outlet 116. This container 112 is cylindrical, having an upper threaded end 118 with a threaded removable cap section 120 connected therethrough and in which the inlet 114 is disposed. Within the container 112 is a removable magnetic conditioning assembly 113 including two spaced apart end plates 122 and 124 that have a cylindrical copper member 126 bonded therethrough. Disposed within this copper member is a row of magnets 66 spaced apart by pairs of concentrator plates 68. On the exterior of the cylindrical wall 126a of member 126 are raised, generally straight partition members 128 which extend either from the one plate 124 upwardly or from the other plate 122 downwardly. This provides a series of pathways indicated by the arrows B, C and D which enables fluid flowing into the inlet 114 to flow downwardly then reverse direction to flow upwardly, first passing between the partitions 128a and 128c turning the corner of partition 128a, flowing upwardly past partition 128c and then downwardly between partitions 128c and 128b and out the outlet 116. The top section 120, because it is removably secured to the container 112, allows the user to unscrew this section and remove the magnetic conditioning assembly for cleaning. The exterior of this cylindrical member 126 is adapted to enable the user to then wipe this surface clean of any metal particles which may be adhering to this surface because of the magnetic force which pulls them from the fluid and holds them to the wall 126a of the cylindrical member.

Magnetic Conditioning Assembly

Figure 24:
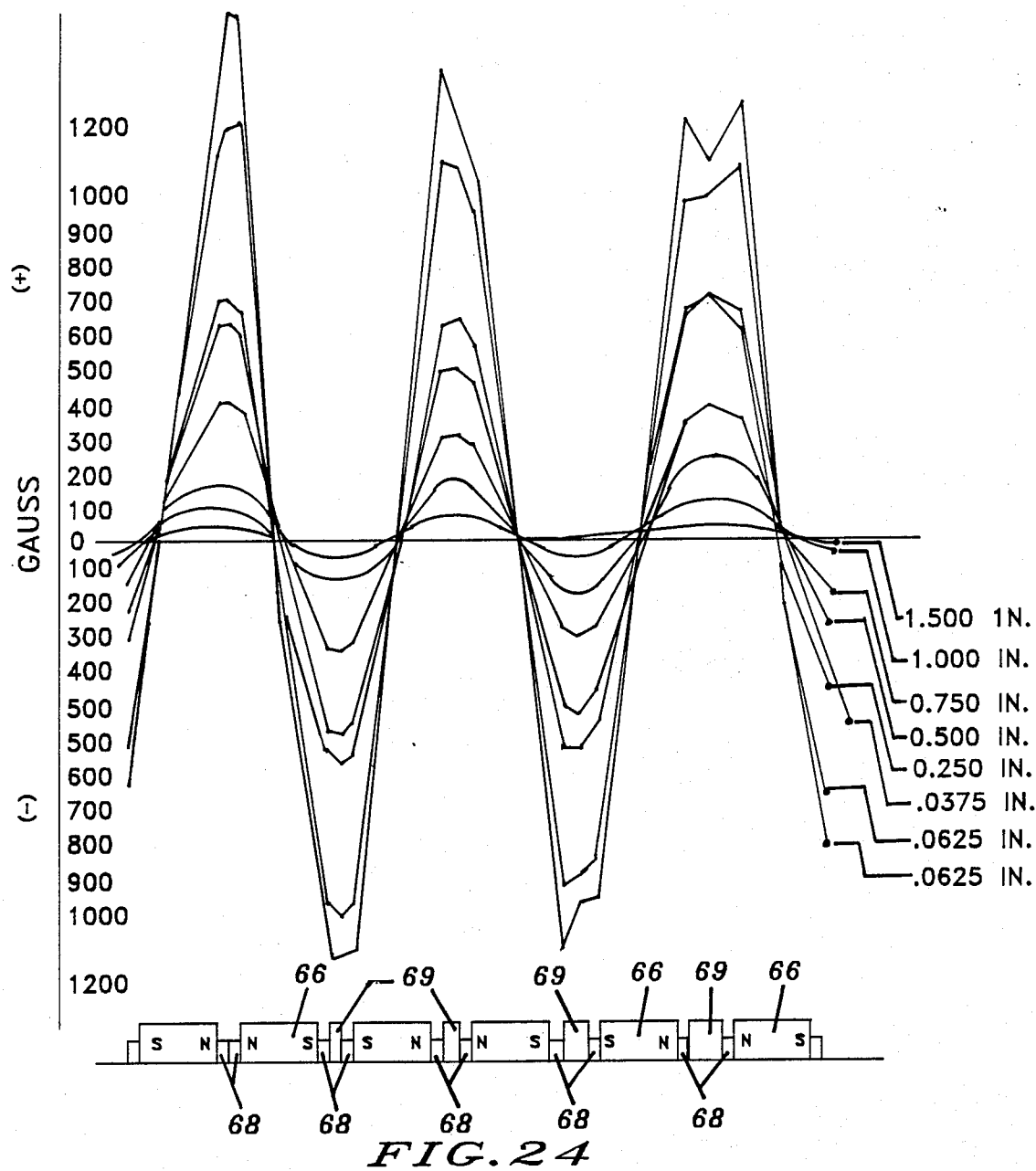
FIG. 24 is a graph depicting the magnetic field surrounding the magnetic array employed in the device shown in FIG. 17.

In accordance with this invention the magnetic conditioning assembly 113 is designed to provide an asymetric magnetic field of controlled, alternating intensity. This alternating magnetic field is illustrated in FIG. 24 wherein the abcissa represents the positions of the concentrator plates 68 and magnets 66 along the flow path of the fluid and the ordinate represents the intensity of the magnetic field. Eight curves are shown in FIG. 24 to illustrate the intensity of the magnetic field at eight different distances from the surface of the magnets. As these curves depict, the intensity decreases as the distance from the magnet increases. The curves also indicate that the intensity of the field approaches zero at about equidistance between the adjacent pairs of concentrator plates (i.e. centers of the magnets) and has its greatest amplitude, in either polarity, opposite the concentrator plates. Note that the concentrator plates can vary in spacing between each other by use of spacer members 69 having different lengths. The magnetic field depicted by the curves shown in FIG. 24 extends radially outwardly from the array of magnets and the fluid flows generally at a right angle to the gradient lines of the field as illustrated by the arrow A. This flow is generally parallel to the longitudinal axis of the magnetic conditioning assembly. In accordance with this invention the magnetic field is asymetric. That is, the distance between concentrator plates 68 is not equal for each set of plates. This is in contrast to such devices as shown in U.S. Pat. No. 4,428,837, which employs spacer of equal length. The advantage of an asymetric magnetic field is that the velocity of the fluid through the field may vary by as much as 50% above or below the design optimum velocity of the device. In designing for effective magnetic treatment, each device is sized based upon the area of the inlet and outlet openings and the throughput of fluid (gallons per minute). There exists a relationship between fluid velocity the magnetic field, and each device has an optimum fluid velocity. When symetric devices are employed, if the fluid velocity deviates from the optimum, the effectiveness decreases. In using an asymetric field, the fluid velocity may deviate substantially from its optimum without substantially affecting the effectiveness of the device. It has also been found that, when the fluid is directed to flow through the asymetric field a plurality of times prior to exiting the container, enhanced treatment is provided. Consequently, all of the embodiments previously discussed include fluid directing means which causes the fluid to make multiple passes through the alternating magnetic field prior to exiting the container.

In accordance with one feature of this invention, it is preferred that the two terminal magnets end with a southern polarity. This enables the fluid to flow in either direction through the container and still provide the desired treatment.

The magnets are contained within the sealed, nonmagnetic, tubular member 70 that is removably mounted within the container 14 and has a surface free of obstructions within the fluid path that would prevent essentially laminar flow. This surface is relatively smooth to facilitate cleaning the surface of any particulate material adhering thereto by magnetic attraction by wiping off said surface after removal of the tubular member 70.

SCOPE OF THE INVENTION

The above description presents the best mode contemplated in carrying out the present invention as depicted by the embodiments disclosed. The combination of features illustrated in these embodiments provide a device which is easy to operate, convenient to maintain, and is reliable. This invention is, however, susceptible to modifications and alternate constructions from the embodiments shown in the drawing and described above. Consequently, it is not the intention to limit it to the particular embodiments disclosed. On the contrary, the intention is to cover all modifications and alternate constructions falling within the scope of the invention as generally expressed by the following claims.

I claim:

1. A device for conditioning a fluid, comprising
   container means having an inlet and an outlet so that fluid enters the container means through the inlet and exits the container through the outlet,
   a plurality of magnets aligned in a row and contained within the container means between the inlet and the outlet, said magnets providing a magnetic field which surrounds the magnets, and
   flow control means including a plurality of passageways proximate the magnets and generally parallel thereto and means for directing the flow of fluid serially through the passageways so that said fluid makes a plurality of passes by the row of magnets prior to exiting the outlet.

2. The device of claim 1 wherein the magnets are aligned along a common axis with each magnet having a north pole and a south pole, said magnets being aligned relative to each other so that the adjacent ends of adjacent magnets are of the same polarity.

3. The device of claim 2 wherein concentrator elements are disposed at each end of each magnet so that there is a pair of concentrator elements between adjacent ends of the magnets.

4. The device of claim 3 wherein there are spacer members between at least some of the magnets.

5. The device of claim 4 wherein the spacer members have different lengths to provide an asymetric magnetic field.

6. The device of claim 1 wherein the magnets are contained within a sealed, nonmagnetic, tubular member that is removably mounted within the container and has a surface free of obstructions within the fluid path that would prevent essentially laminar flow and be relatively smooth to facilitate cleaning said surface of any particulate material adhering thereto by magnetic attraction by wiping off said surface after removal of the tubular member.

7. The device of claim 1 wherein the row of magnets is surrounded by filter means and the fluid is directed to first flow through the filter means and then through the magnetic field.

8. The device of claim 1 wherein the flow control means comprises a plurality of tubular members surrounding the row of magnets, the said tubular members being concentric and spaced apart to provide therebetween multiple passageways for the fluid.

9. The device of claim 1 wherein the flow control means comprises a plurality of tubular members through which the fluid flows surrounding the row of magnets, said tubular members being spaced apart and in communication with each other and having means for directing the fluid to flow serially through the tubular members from the inlet to the outlet.

10. The device of claim 1 wherein the row of magnets are contained within a sealed, nonmagnetic tubular member which has a plurality of spaced apart, parallel partition wall means that serve as the flow control means.

11. A device for conditioning a fluid, comprising
    container means having an inlet and an outlet so that fluid enters the container means through the inlet and exits the container means through the outlet,
    a sealed, nonmagnetic tubular member having therein a row of magnets aligned along the longitudinal axis of the tubular member, each magnet having a north pole and a south pole and aligned relative to each other so that the adjacent ends of the adjacent magnets are of the same polarity,
    concentrator element disposed at each end of each magnet so that there is a pair of concentrator elements between adjacent ends of the magnets to create an asymetric magnetic field of controlled, alternating intensity along a path generally parallel to said longitudinal axis,
    said tubular member being disposed within the container means so that the magnets are between the inlet and the outlet, and being adapted to be removed, and
    flow control means including a plurality of passageways adjacent the magnets and generally parallel thereto and having lengths longer than the row of magnets and means for directing the flow of fluid serially through said passageways so that said fluid makes a plurality of passes by the row of magnets prior to exiting the outlet.

12. A device for conditioning a fluid, comprising
container means having an inlet and an outlet so that fluid enters the container means through the inlet and exits the container through the outlet,
a plurality of magnets aligned in a row along a common axis and contained within the container means between the inlet and the outlet, each magnet having a north pole and a south pole and aligned relative to each other so that the adjacent ends of the adjacent magnets are of the same polarity.
concentrator elements disposed at each end of each magnet so that there is a pair of concentrator elements between adjacent ends of the magnets to create an asymetric magnetic field of controlled, alternating intensity along a path generally parallel to said common axis,
a plurality of passageways through which the fluid flows surrounding the row of magnets, and
means for directing the fluid flow serially through the passageways from the inlet to the outlet.

13. A device for conditioning a fluid, comprising container means having an inlet and an outlet so that fluid enters the container means through the inlet and exits the container means through the outlet,
a plurality of magnets aligned in a row along a common axis with each magnet having a north pole and a south pole, said magnets being disposed in the container means between the inlet and the outlet and aligned relative to each other so that the adjacent ends of the adjacent magnets are of the same polarity,
concentrator elements disposed at each end of each magnet so that there is a pair of concentrator elements between adjacent ends of the magnets to create an asymetric magnetic field of controlled, alternating intensity along a path generally parallel to the common axis of the magnets,
a plurality of passageways extending through the magnetic field and disposed generally parallel to said common axis and having lengths longer than the row of magnets, and
means for directing the fluid to flow through the field serially through said passageways.

* * * * *